Jan. 21, 1964  G. S. NALLE, JR  3,118,180
METHOD AND APPARATUS FOR EXTRUDING TWO COLOR MESH FABRICS
Filed Sept. 2, 1959  4 Sheets-Sheet 1
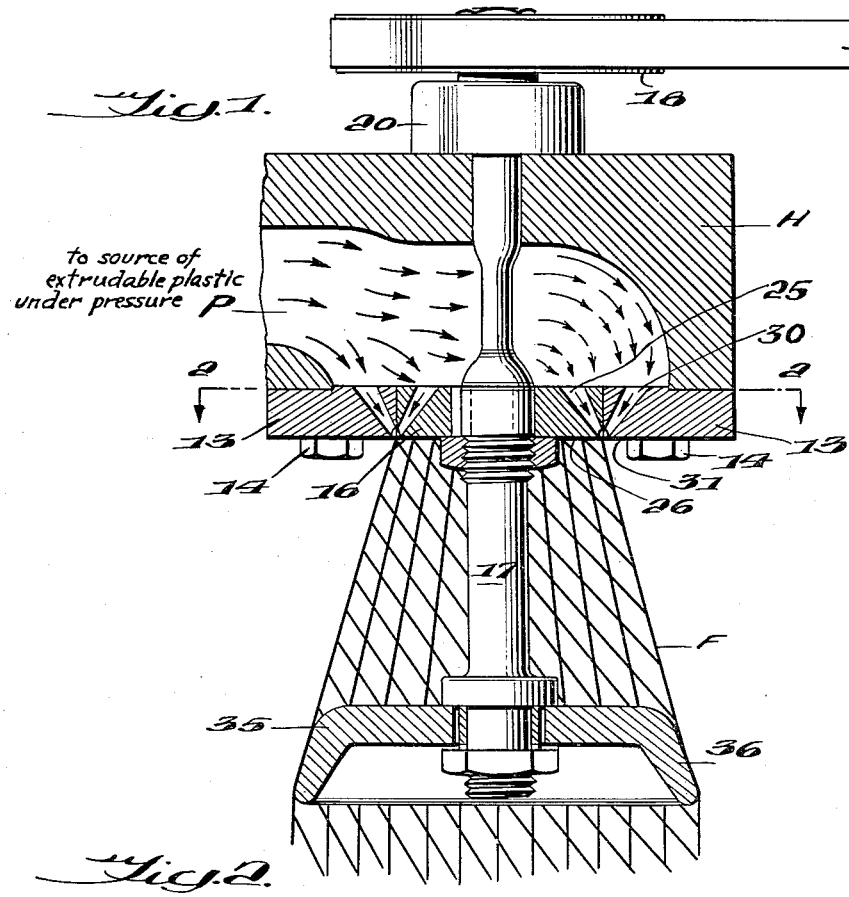
Fig. 1.
Fig. 2.
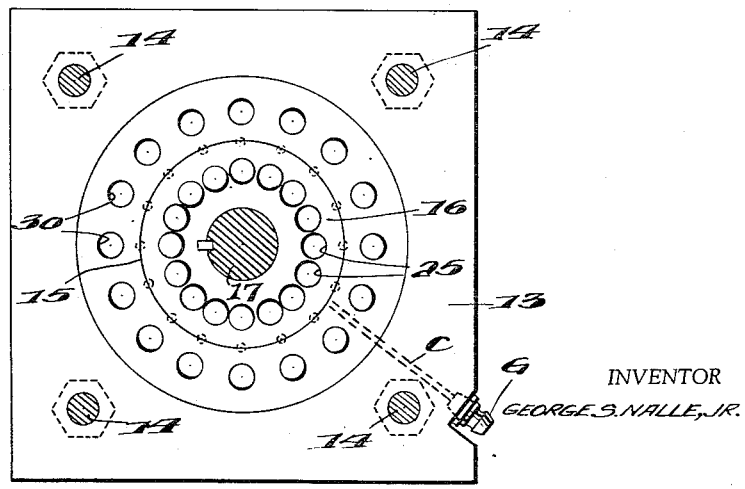
INVENTOR
GEORGE S. NALLE, JR.
BY
ATTORNEY Jan. 21, 1964　　　G. S. NALLE, JR　　　3,118,180
METHOD AND APPARATUS FOR EXTRUDING TWO COLOR MESH FABRICS
Filed Sept. 2, 1959　　　　　　　　　　　　4 Sheets-Sheet 2
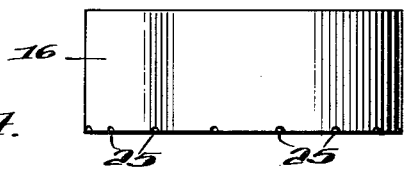
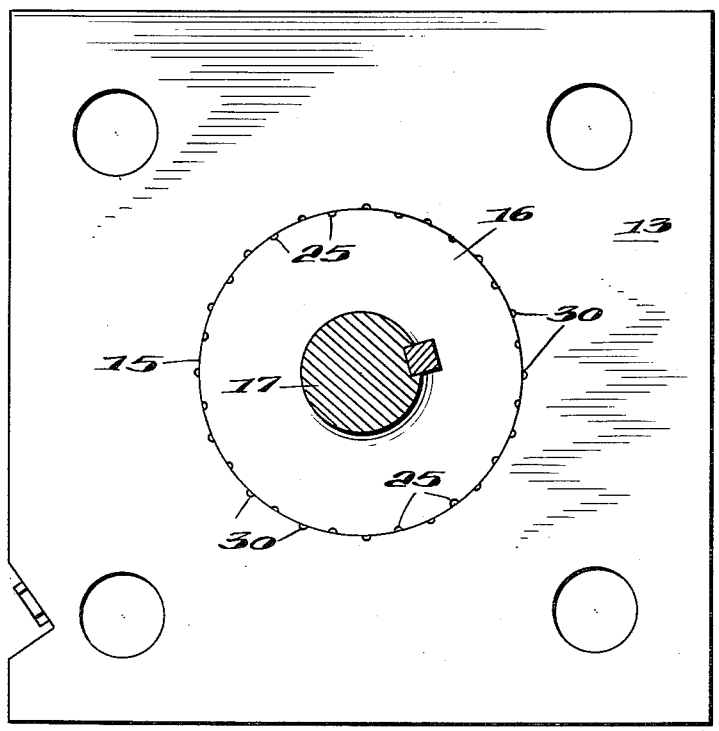
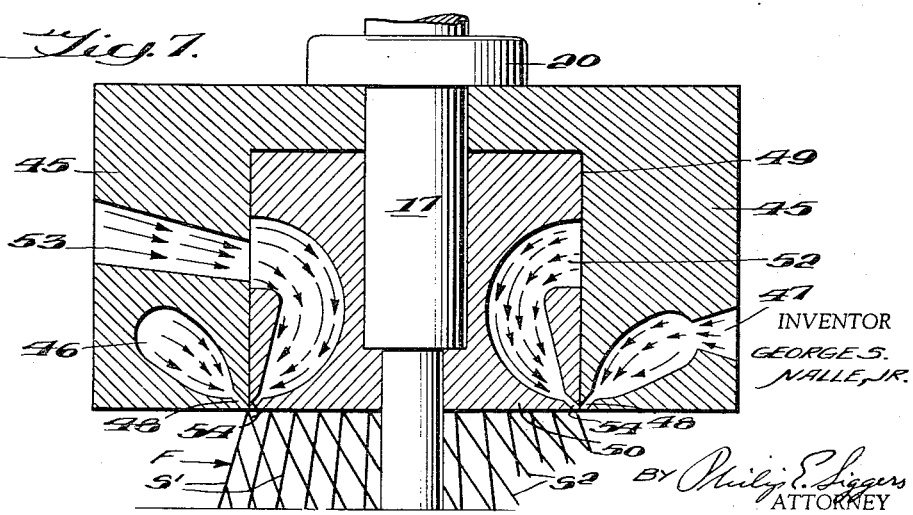
INVENTOR
GEORGE S.
NALLE, JR.
BY Philip E. Liggers
ATTORNEY

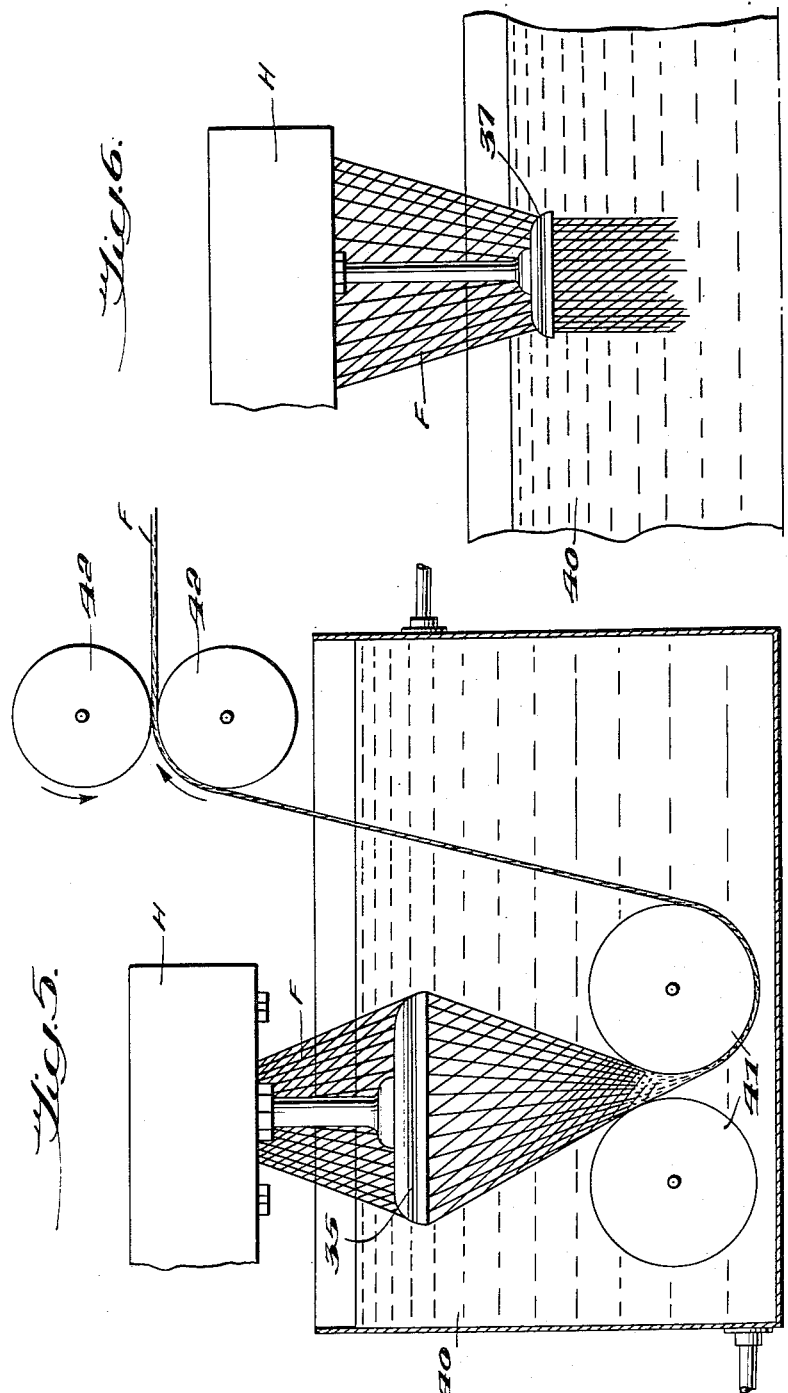

INVENTOR.
GEORGE S. NALLE, JR.
BY

United States Patent Office 3,118,180
Patented Jan. 21, 1964

3,118,180
METHOD AND APPARATUS FOR EXTRUDING
TWO COLOR MESH FABRICS
George S. Nalle, Jr., 108 W. 2nd St., Austin 1, Tex.
Filed Sept. 2, 1959, Ser. No. 837,732
2 Claims. (Cl. 18—13)

This invention relates to a method and apparatus for forming a two color mesh fabric of resinous plastic material, although the invention may also be useful in the extrusion of many types of plastic material.

According to the present invention, a die head is provided having a stationary die plate surrounding a rotary die plate; both die plates have extrusion openings arranged in circular series; the pressurized plastic mixture is forced through the two series of extrusion openings to form groups of strands or filaments of indefinite length; and the group of rotating strands from the rotating die plate are caused to fuse or coalesce with the group of non-rotating strands from the stationary die plate at points just inside the die head to form a tubular netting or mesh cylinder of integrated strands. The netting or mesh is extruded in two contrasting colors, one group of strands being of one color, the other group (which crosses the first group) being of another color, to make a netting of striking appearance and even beauty. After it is extruded, the tubular netting while still soft is pulled over the periphery of a circular spreader or mandrel whose diameter is large enough to substantially expand the netting tube to any desired extent within the limitations imposed by the material extruded. The spreader or mandrel is mounted to rotate freely and turns at a velocity determined by the movements of the plastic netting contacting its periphery. If the mandrel is of suitably small dimensions, it may effect a shrinking of the netting, reducing the tube diameter and the mesh size, upon pulling the netting rapidly over the smaller mandrel, concomitantly lengthening the netting. The coalescing of the crossed strands at points just inside the die head results in a more perfect union, the netting being much stronger at the points of juncture than in the strands themselves. Also the netting may be so formed that it is of nearly the same thickness throughout, i.e., the points of juncture have only a little more thickness than the strands themselves. Whether the netting tube is stretched or shrunk with the aid of a mandrel, it is usually passed simultaneously through a water bath to harden the plastic strands and make the fabric easier to handle in further operations. Following the water bath, the plastic tube may be cut longitudinally and laterally to form a netting of a single thickness and of the desired dimensions.

Other aspects, objects and advantages of my invention will be understood from the following description of certain forms of apparatus and some of the products thereof which are shown in the accompanying drawings forming a part of this specification.

In said drawings:

FIG. 1 is a vertical sectional view of a die head containing an extrudable plastic mix, showing a tubular netting being formed from said plastic mix, also showing a mandrel which stretches the tubular netting as it is formed;

FIG. 2 is a horizontal section on line 2—2 of FIG. 1, the elliptical ends of the conical extrusion openings being shown as circular for convenience of illustration;

FIG. 3 is a side elevation of the rotary die plate;

FIG. 4 is a bottom plan view of the stationary and rotary die plates, the rotary die plate being shown in an angular position to form the open sections of the netting and not the crossings;

FIG. 5 is a diagrammatic view in vertical section and elevation showing the die head, the tubular netting, a water bath for hardening the netting, and means for drawing off the netting as it is formed;

FIG. 6 is a diagrammatic view in elevation, showing how a mandrel of suitably small dimensions may be used with the die head of FIG. 1 to reduce the diameter and mesh openings of the tubular netting;

FIG. 7 is a diagrammatic view in vertical section of a die head for forming nettings in two colors by a single continuous operation;

Figure 8:
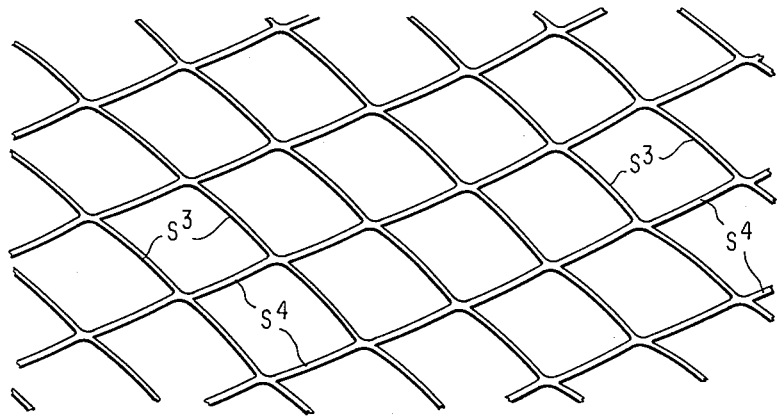
FIGS. 8, 9 and 10 are full size reproductions in plan of three different nettings actually made by the die heads of the invention.

Referring particularly to the drawings, I have shown a die head H which is located at the discharge end of a container (not illustrated) holding a supply of heated resinous plastic P which during operations will be under considerable pressure from an extruder screw (not shown) or equivalent pressurizing mechanism. The plastic P may be any extrudable resinous plastic such as nylon (polyamide), polyethylene, vinyl polymers and copolymers, styrene polymers and copolymers, acrylic polymers and copolymers, polypropylene, cellulosics, etc. The die head H has a large discharge throat 12 which is closed by two die plates. The stationary die plate 13 is rigidly but removably secured by studs 14 to the die head and has a circular opening 15 in which the rotary die plate turns. The rotary die plate 16 is an annulus with a finished circular periphery fitting closely in opening 15; this fit being so close as to prevent leakage of the pressurized plastic between the two die plates. A grease fitting G and grease channel C may be provided to lubricate the bearing surfaces at 15. The rotary die plate 16 is removably secured to a drive shaft or spindle 17 which extends out through a wall of the die head H. A drive pulley 18 is fixed to spindle 17 and is adapted to be turned by a V-belt 19 connected to a motor-driven speed reduction gear train (not shown), or any other suitable source of power, thereby to rotate the die plate 16 at the proper angular velocity to form the desired netting. A thrust bearing 20 supports the spindle 17 and the rotary die plate against the considerable thrust of the pressurized plastic.

Extending through the annular rotary die plate 16 are a circular series of equally spaced extrusion openings or passages 25, each opening 25 being conical, with its large end innermost to receive the pressurized plastic. The axis of each opening 25 lies at an acute angle to the outer face 26 of the rotary die plate 16, and the large or inlet ends of the openings are nearly equally spaced between the inner and outer peripheries of the annulus 16. Due to the acute angles of the openings 25, the small outlet or discharge ends terminate at the outer periphery of said annulus and also at the outer face 26, as shown in FIGS. 3 and 4. The diameter of the extrusion openings 25 at the inlet ends may be ¼ in., and their width at the discharge ends may be as little as .010 in. These dimensions are merely illustrative. There may be as few as 12 or as many as several hundred extrusion openings in a rotary die plate made in accordance with my invention.

Near the circular opening 15 the stationary die plate 13 is provided with a circular series of equally spaced conical extrusion openings 30 (equal in number to the extrusion openings 25) which have their inlet or pressure ends set back from the opening 15, while their outlet or discharge ends terminate at the opening 15 immediately adjacent the outer face 26 of the rotary die plate 16. It will be noted from FIG. 1 that the angles of the axes of the conical extrusion openings 25, 30 are symmetrical with respect to the bearing opening 15, or stating the matter in another way, the angle of the extrusion openings 25 relative to outer face 26 is the same as the angle of extrusion openings 30 relative to the outer face 31 of the stationary plate 13. Other angular dispositions of the extrusion openings may be employed. The extrusion openings 30 will normally have the same dimensions as openings 25.

Freely supported on the spindle 17 at a point well spaced from the outer faces 26, 31 of the die plates is a circular mandrel 35 having a peripheral flange 36 which is smooth-surfaced and curved convexly for smooth rubbing contact with the tubular mesh fabric F formed by the die head. Usually the mandrel 35 is supported about 6 in. from the die heads, and it is freely (loosely) mounted on spindle 17 so that it does not rotate with the spindle but only as caused to turn by the reaction from rubbing contact with tubular fabric F. The general plane of mandrel 35 is at right angles to the extrusion axis, which is also the axis of spindle 17. When it is desired to stretch the fabric F to enlarge its diameter and mesh openings and decrease the diameter of the strands, the mandrel will be a spreader having a diameter considerably larger than the "extrusion circle," i.e., the imaginary circle intersecting the discharge ends of the extrusion openings; and the mandrel 35 is of that type. Sometimes it is preferred to shrink the tubular fabric and reduce the size of its meshes; in that case a mandrel 37 is used (see FIG. 6) which is considerably smaller than the imaginary circle mentioned above. When a small or fabric-shrinking mandrel as 37 is employed, the fabric is concomitantly lengthened, hence must be drawn away more rapidly than when a spreader 35 is used. As the mandrels 35, 37 are freely mounted, they do not rotate with the spindle but turn only responsive to the frictional reaction of the tubular fabric F on the mandrel periphery.

It is desirable to harden the fabric F soon after it is formed, and to this end a water bath 40 (FIGS. 5 and 6) may be employed. Preferably the mandrel 35 or 37 is immersed in the bath. Guide rollers 41 may be used to collapse the tubular fabric and guide it out of the water bath to power rolls 42, which pull the fabric away as fast as it is formed. The fabric may then be roller up, or it may be cut by knives (not shown) to make it of single thickness and suitable dimensions, and then be packaged.

Referring to FIG. 7, the die head may contain two separate sources of plastic of different colors, each plastic source being under sufficient pressure for extrusion. Secured to the die head is a stationary die plate 45 having an annular chamber 46 formed therein which has one or more inlets 47 that communicate with one of the supplies of colored plastic. Also communicating with annular chamber 46 are a circular series of small extrusion openings 48, equally spaced apart about the periphery of the opening 49 in which the rotary die plate 50 turns. (Reference should be made to FIG. 1 for more details.) The extrusion openings 48 terminate at the outer surface 51 of die plate 45 and also at the bearing opening 49. The rotary die plate 50 has an annular chamber 52 which is supplied by an inlet 53 (or there may be several inlets) communicating with the other source of colored plastic. A circular series of small extrusion openings 54 are supplied by the plastic under pressure in annular chamber 52. The plastic strands $S'$ extruded from openings 48 may be initially parallel, or they may diverge as illustrated when they are pulled over a spreader mandrel, or they may converge if they travel over a shrinking mandrel 37. The set of strands $S^2$ extruded from the rotating die plate 50 will move in a spiral path, crossing the strands $S^1$ and coalescing or fusing at the crossings, as described above in connection with FIGS. 1 and 2. The product is a two-color netting which may be stretched or shrunk as desired, by the method described above.

FIG. 8 shows in full size a colored netting which has been stretched. In this example, most of the stretching has taken place in the strands $S^3$, which are noticeably thinner than the strands $S^4$. If desired, the stretching may be made equal in both groups of strands.

Figure 9:
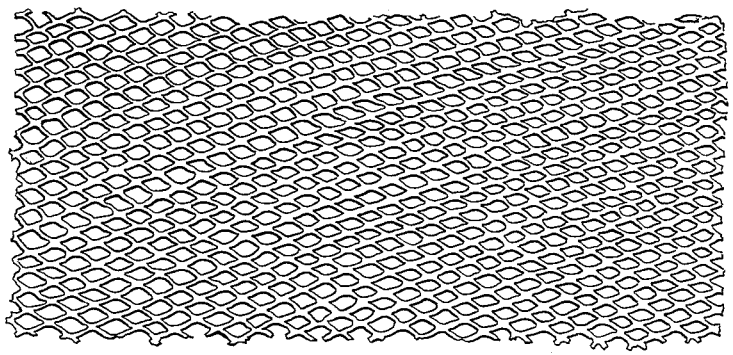

FIG. 9 shows a clear plastic netting made on an experimental basis and hence having small imperfections. This fabric drapes fairly well.

Figure 10:
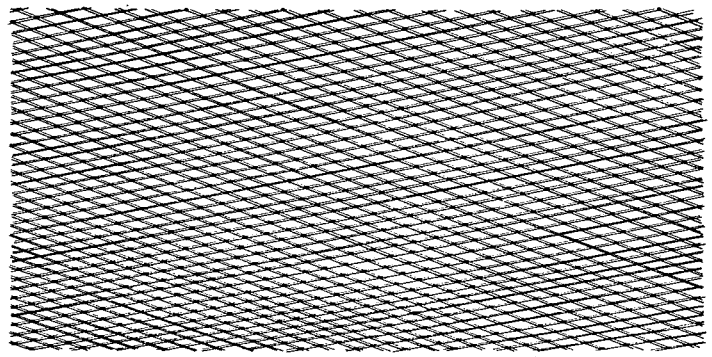

FIG. 10 shows a clear plastic netting which has been considerably shrunk and hence lengthened. This too is an experimental form of mesh fabric. It is very flexible and drapes well.

All three forms (FIGS. 8, 9 and 10) have their crossings of less than twice the diameter of the individual strands, that is, the strands actually coalesce and merge at the crossings to make a fabric which is stretchable but has most of its strength concentrated in the crossings.

By employing a source of extrudable metal and a heated plastic metal extruder of a type well known in industry, together with the described die plates, plastic metal may be extruded as a netting in a single pass or operation. This type of apparatus is not illustrated, but its construction will be obvious to those skilled in the art of plastic metal extrusions.

The plastic nettings of my invention may be used as room decorations, screens, draperies and the like; also for entomologists' nettings, dip nets, salt water fish nets, insect screens, fruit and vegetable packages and carriers, reinforcements and decorations for textile fabrics, especially unwoven fabrics, reinforcements and decorative layers for plastic containers such as tumblers, wastebaskets, etc. The nettings may be made with soft filaments as fine as .010 in., or by extruding impact styrene may be fairly rigid and coarse. The plastic metal nettings may be used in making many products now made of expanded metal, and will be inexpensive because of the fact that the operation is a single pass operation. Other uses will be apparent to those skilled in the art.

Having described three of the hundreds of different nettings which may be made by my process, I append claims to the apparatus and process; it being understood that many changes may be made in the described apparatus and process in order to obtain different products.

What I claim is:

1. A method of forming in a single operation two color mesh fabrics from extrudable plastics comprising extruding from one source of such a plastic a plurality of strands of one color, all running parallel to each other and spaced apart about an axis; extruding a plurality of strands of another color all running parallel to each other and spaced apart about the same axis; rotating one group of strands as they are formed about said axis to cause them to cross the other group of strands and coalesce at the crossings, thereby to form continuously a tubular open mesh unitary plastic fabric of two colors and of indefinite length.

2. Apparatus for forming in a single operation a two color mesh fabric of indefinite length from extrudable plastics comprising, in combination, a die body containing two separate extrudable plastics supplies of different colors; power-driven means to effect extrusion of said plastics simultaneously; die plate means having extrusion openings and being fixed to said die body and adapted to form a plurality of endless plastic strands from one of said supplies; a second die plate means having extrusion openings and being rotatably mounted on said die body and adapted to form a plurality of endless plastic strands from the other of said supplies; power means to rotate the rotatable die plate means; the rotatable die plate means rotating about an axis which is in the center of the endless plastic strands formed from said fixed die plate means, so that the two groups of strands as they are formed cross each other at regular intervals and coalesce at the crossings.

References Cited in the file of this patent

UNITED STATES PATENTS

| 2,720,680 | Gerow | Oct. 18, 1955 |
| 2,808,617 | Terracini et al. | Oct. 8, 1957 |
| 2,814,071 | Allan et al. | Nov. 26, 1957 |
| 2,919,467 | Mercer | Jan. 5, 1960 |

FOREIGN PATENTS

| 17,549 | Great Britain | of 1898 |
| 153,610 | Australia | Oct. 13, 1953 |
| 552,251 | Belgium | Nov. 14, 1956 |